May 18, 1926.

A. R. WARNER

SIGNAL LIGHT

Filed Sept. 26, 1923    3 Sheets-Sheet 1

1,585,578

Albert Rodgers Warner
INVENTOR

BY Victor J. Evans
ATTORNEY

WITNESS:

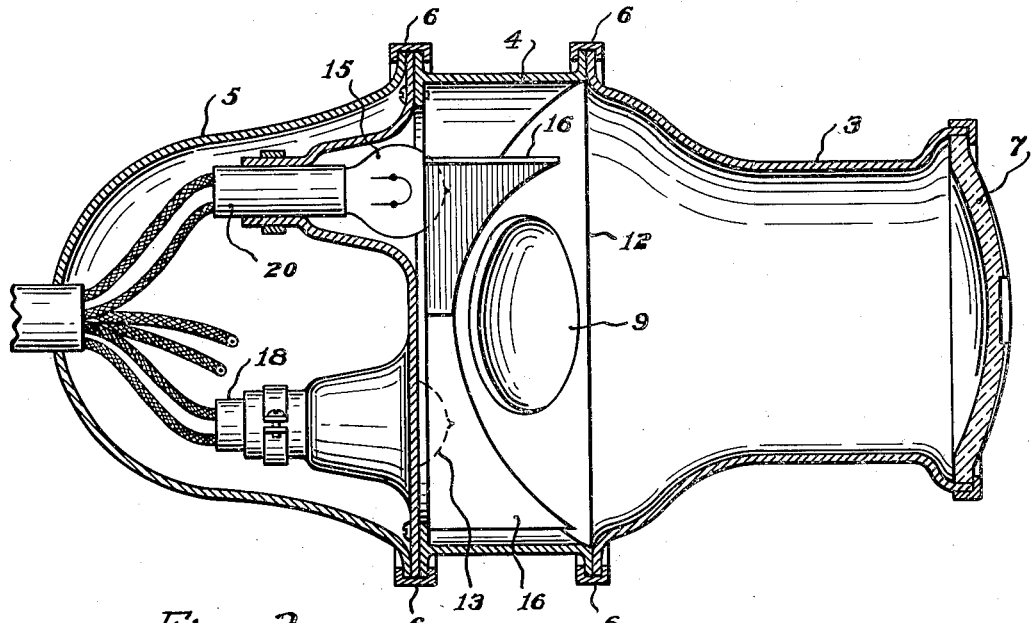
Fig. 2.
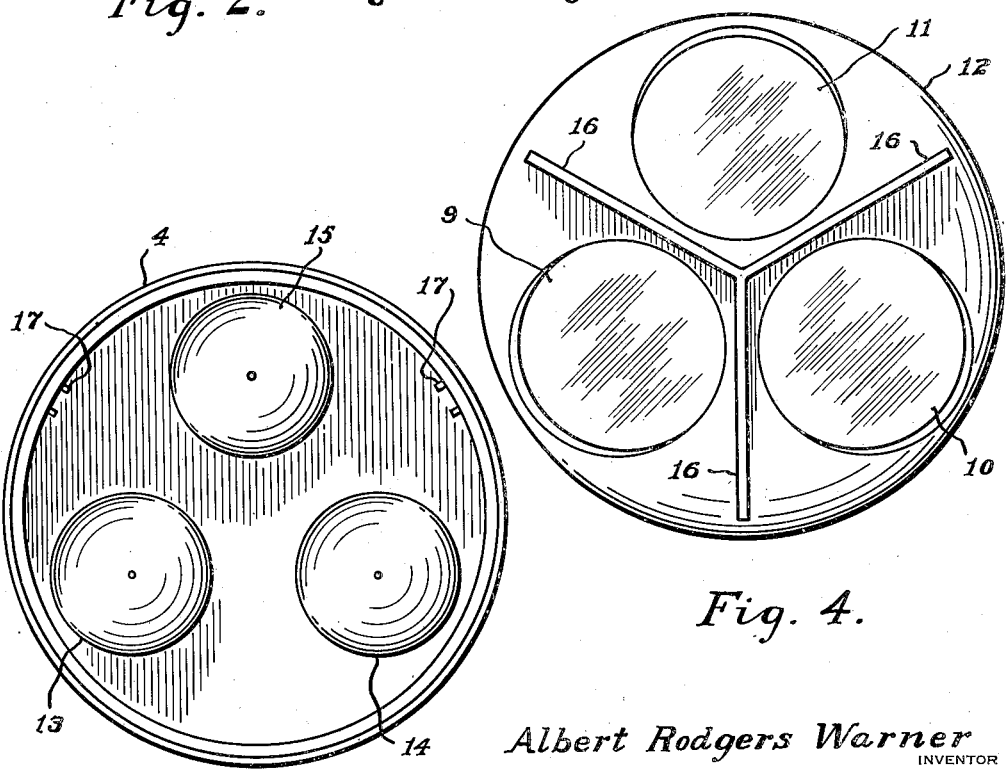
Fig. 3.
Fig. 4.
Albert Rodgers Warner
INVENTOR

May 18, 1926.
A. R. WARNER
SIGNAL LIGHT
Filed Sept. 26, 1923   3 Sheets-Sheet 3
1,585,578
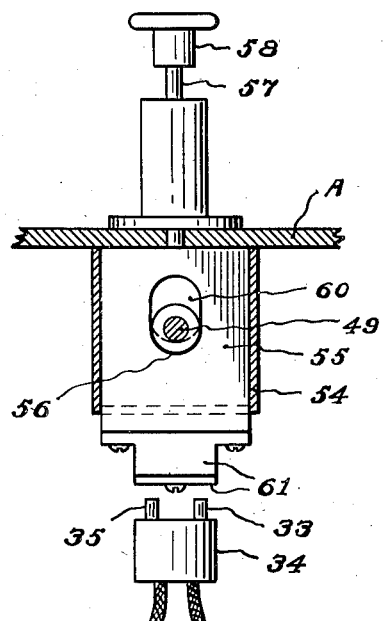
Fig. 7.
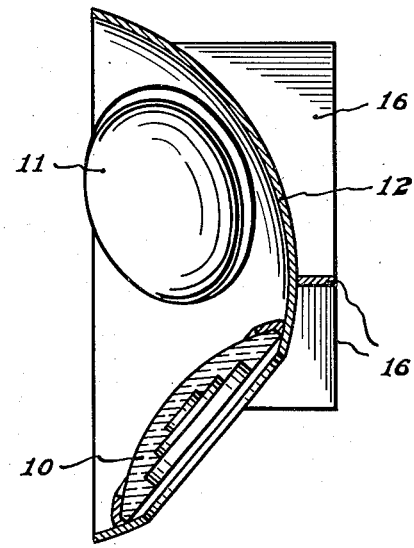
Fig. 5.
Fig. 8.
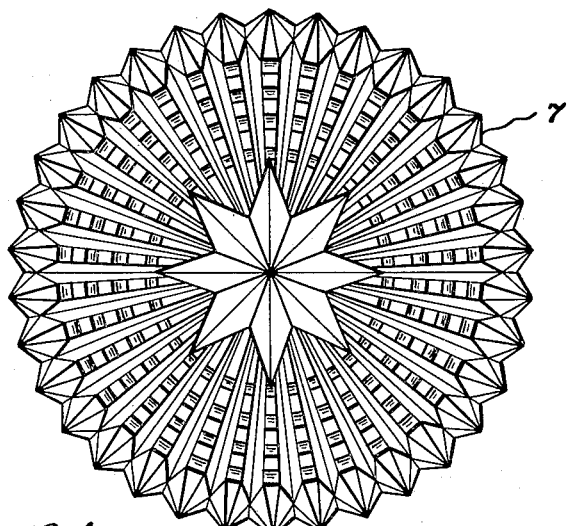
Albert Rodgers Warner
INVENTOR
BY *Victor J. Evans*
ATTORNEY
WITNESS:

Patented May 18, 1926.

1,585,578

UNITED STATES PATENT OFFICE.

ALBERT RODGERS WARNER, OF PHILADELPHIA, PENNSYLVANIA.

SIGNAL LIGHT.

Application filed September 28, 1923. Serial No. 664,973.

This invention relates to signal lights adaptable for use on motor vehicles or for traffic signals at street intersections.

An object of the invention is to provide a signal light structure which is comparatively simple in construction and which will reflect, through a common lens, a multiple color of lights, preferably red, green and yellow.

Another object of this invention is to provide a signal mechanism as specified in which the red or danger signal light is automatically illuminated upon operation of the clutch or brake pedal of motor vehicle, and to provide manually releasable means for controlling the distinguishing of the danger or stop signal so that while travelling in heavy traffic, the danger or stop signal may be maintained illuminated even though the operator's foot is removed from the clutch or brake pedal of the motor vehicle.

A further object of this invention is to provide a signal mechanism as specified, embodying contrasting color signals or to indicate right and left-hand turns which signal lights are manually controlled from a suitable switch structure on the instrument board of the vehicle, and also to provide a novel switch and wiring arrangement whereby when the vehicle is stopped during the operating of either the right or left-hand turn signals, the turn signal will be extinguished and the stop signal will show, the said stop signal continuing to show until its control mechanism is manually operated at which time the right or left turn signal will again show. This feature is particularly adapted for use in cities where the traffic is comparatively heavy and where the driver of the vehicle, signals to take either a right or left hand turn, and where he is stopped by traffic regulations before he can take said turn.

A still further object of the invention is to provide a signalling structure in which a plurality of different colored lenses are associated in a suitable lens carrying plate and which are disposed at acute angles relative to each other and relative to a vertical plane, and are also disposed with their centers in a circle concentric with the axis of the lens carrying plate, and also to associate with said colored lens a transparent clear light diffusing lens which is cut or formed with light diffusing means at its center gradually radiating from the axis of the clear lens for operating and intensifying the light rays which are reflected through the colored lens directly to the center of the clear lens.

Other objects of the invention will appear in the following detail description and in the accompanying drawings wherein:—

Figure 2 is a longitudinal vertical section through the signal lamp structure.

Figure 3 is a vertical cross section through the lamp structure.

Figure 4 is a detail view of the colored lens carrying plate.

Figure 5 is a front elevation of the lens carrying plate.

Figure 7 is a vertical cross section through the switch structure.

Figure 8 is a face view of the light distributing lens used in the lamp.

Figure 1:
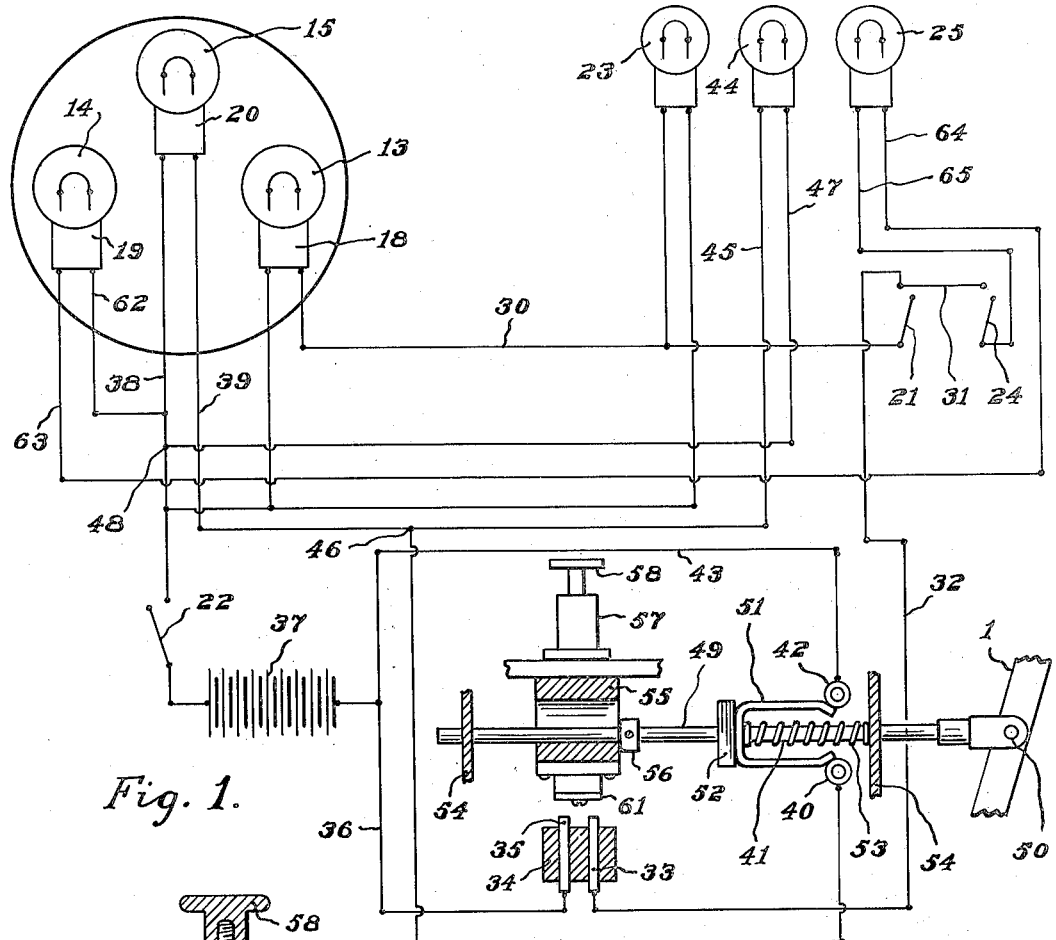
Figure 1 is a diagrammatic view of the improved signal mechanism showing the electrical circuits embodied in the signal.

Referring more particularly to the drawings, the improved signal light structure is illustrated as connected with the clutch or brake pedal 1 of a motor vehicle for operation upon operation of the said foot pedal. However, it is to be understood that the signal structure may be operated from a manually controlled lever when used as a traffic signal at street intersections, and also that a number of the signal structures may be connected in circuit to be operated from a single hand lever permitting one traffic policeman to have control of several signals.

The signal lamp structure proper, comprises a housing or body shell which comprises the forward lens carrying section 3, central bulb carrying section 4, and the socket carrying section 5. The sections 3, 4 and 5 are detachably connected by suitable clamping bands 6 so as to permit quick and easy detachment of the sections to gain access to the interior thereof when desired. The front lens carrying section 3 has a lens 7 therein which lens is concavo-convex, having its concaved surface positioned inwardly and the lens is cut or moulded in the particular pattern as illustrated in Figure 8 of the drawings, so as to project the light rays in a relatively wide path, and for a relatively great distance. The lens is cut with an eight-pointed star in its center, the points of which converge at the axis of the lens, and which points incline inwardly toward the concaved surface from their outer tips to the axis of the star so as to provide both radially and tangentially inclined surfaces for receiving and reflecting the light rays. The lens is provided with a plurality of ribs radiating from the axis of the lens which ribs are in turn cut or moulded to provide circular concentric grooves gradually decreasing in size towards the center of the lens. The innermost groove is positioned a short distance outwardly of the outer points of the central star. The particular construction of the lens 7 is made necessary owing to the manner of mounting the respective colored lenses 9, 10 and 11. The lens 9 is preferably green, the lens 10 yellow, and the lens 11 red, for indicating respective "left" turn, "right" turn and "stop" actions of a motor vehicle.

The lenses 9, 10 and 11 are carried by the lens carrying shell 12 which is concavo-convex, and has its concaved surface facing the lens 7. The various lenses 9, 10 and 11 are positioned at the concaved side of the shell 12 as clearly shown in the drawings, and they incline toward the axis of the shell, so that the light rays penetrating through the lenses from the respective light bulbs 13, 14 and 15, will be deflected in paths at acute angles to the horizontal and strike against the star in the center of the lens 7 where they will be reflected and thus the entire surface of the lens 7 will reflect a light of the color of the respective colored lens through which the light is travelling, thereby preventing only a part of the lens 7 from reflecting the light.

The shell 12 has radiating ribs 16 carried thereby which divide the back of the shell into three parts in each of which one of the lenses 9, 10 and 11 is positioned. The ribs 16 fit in suitable guides 17 formed in the central shell section 4 and they fit against the inner rear wall of the shell section 3, dividing the interior of the shell or body section into three separate compartments so as to prevent the rays caused by the illumination of one of the light bulbs 13, 14 and 15 from passing through more than one of the colored lenses. The light bulbs 13, 14 and 15 are of any conventional form of light bulb and are removably supported in sockets 18, 19 and 20 of any conventional approved type. The sockets project into the rear section 4 of the body housing and are connected in circuit with their respective control members.

The socket 18 which carries the light bulb 13 for illuminating the green lens 9 has one contact connected with a hand switch 21 and through a suitable plug switch structure 22 with a battery or other suitable power supply source. The switches 21 and 22 may be of any desired approved type. A pilot light 23 is connected in circuit with the socket 18 so that when the light bulb 13 is energized, the pilot light 23 will be energized and when the device is used as a signal for motor vehicles, the pilot light is positioned on the instrument board or in any suitable place where it may be easily observed by the operator or driver of the vehicle so that he knows when the pilot light is energized that the light bulb 13 is consequently energized.

The socket 19 which carries the light bulb 14, the rays from which are projected through the yellow lens 10 is connected to a switch structure 24 which may be of any conventional manually operated type, and it is connected to the plug switch 22, a pilot light 25, the operation of which is similar to the operation of the pilot light 23, and it is associated and connected in circuit with the socket 18.

In Figure 1 of the drawings, the circuit arrangement of the improved signal light is clearly shown in which it will be observed that the socket 18 which carries the green light bulb 13 is connected by means of the wire 30 with the switch section 21 of the double pole switch structure 31, and through the switch structure 31 and wire 32 with the contact 33. The contact 33 is connected by a suitable plug 34 of insulating material, which plug also connects a second contact 35 having return connection through the wire 36 with the battery or other suitable supply source 37. The socket 20 which carries the red light bulb 15 is connected by means of the wire 38 through the plug switch 22 with the battery 37 and it is connected through the wire 39 with the contact 40 of the pedal or lever operated switch structure 41. The contact 42 of the switch structure 41 is connected by means of the wire 43 with the battery 37 so as to provide a complete circuit between the battery 37 and light bulb 15 through the lever or pedal control switch structure 41. The pilot light 44 is connected through a shunt circuit with the light 15, for simultaneous exciting and the said shunt circuit includes a wire 45 which is connected to the wire 39 as shown at 46, so that the shunt circuit will be controlled also by operation of the switch 41. The wire 47 of the shunt circuit is connected directly to the wire 38 as shown at 48.

The lever or pedal operated switch structure 41 comprises the space contacts 40 and 42 which are preferably cylindrical in shape, and it also comprises a rod 49 which is connected in any suitable manner as shown at 50 to the lever or pedal 1. A substantially U-shaped contact bridge 51 is carried by a rectangular block 52 which is mounted upon the rod 49 and the legs of the bridge 51 are adapted to engage and bridge the contacts 40 and 42 when the lever or pedal is operated to apply the brakes of a vehicle or to ignite the signal lights of a traffic signal. Spring 53 is coiled about the rod 49 and engages at one end against the block 52 and at its opposite end against the housing 54 which encloses the switch structure. The spring 53 tends to urge the rod 49 outwardly out of circuit closing position and when the circuit is operated, the spring is held under tension and the circuit is held closed by means of the engagement of the slidable control member 55 with the collar 56 which is mounted on the rod 49. The slidable control member 55 is mounted for vertical movement, and it has a stem 57 connected thereto which projects upwardly through the floor A, which maybe the floor of the vehicle or a traffic stand. The stem 57 has a button 58 upon its upper end and a spring 59 is associated with the stem for normally urging the stem and control block 55 upwardly. The control block 55 is provided with an opening 60 therein through which the rod 49 extends and which opening is of sufficient size to permit the collar 56 to move therein.

Figure 6:
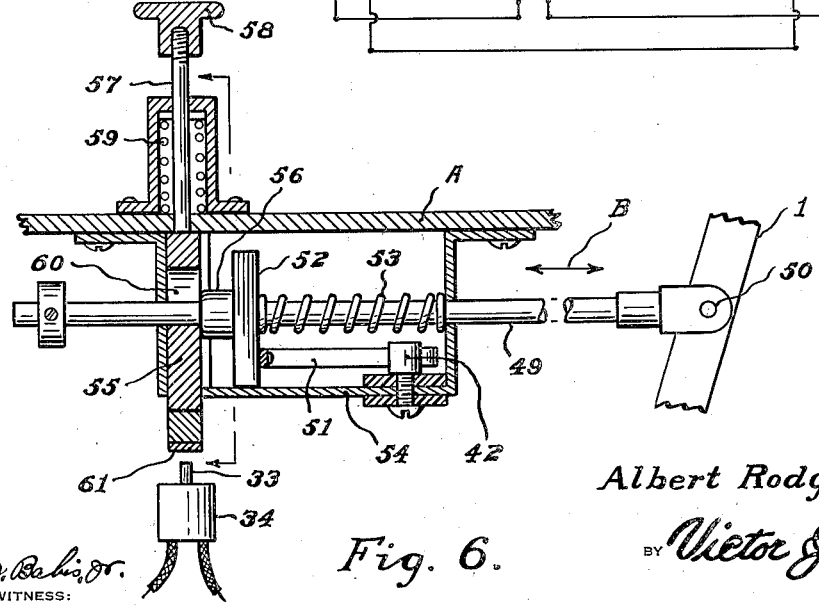
Figure 6 is a longitudinal section through the switch structure.

In operation, when the lever or pedal 1 is operated, to apply the brake of the vehicle or in a traffic signal, for igniting the lights, the rod 49 is moved outwardly in the direction indicated by the arrow B in Figure 6 of the drawings which moves the bridge 51 into contact bridging position and closes the circuit through the red or stop bulb 15 and through its corresponding pilot light 44. The circuit is held closed, even after release of the brake, or lever 1 by the control block 55, which moves upwardly under action of the spring 59, upon outward movement of the rod 49 and when it is moved upwardly and the lever or pedal 1 released, the spring 53 causes a binding action between the collar 56 and control block 55. When it is desired to extinguish the light 15, the control block 55 is forced downwardly by applying pressure to the button 58 which moves the opening 60 into registration with the collar 56 at which time the spring 53 forces the collar 56 into the opening 60, and moves the contact bridge 51 out of engagement with the contacts 42.

As specified in the objects of the invention, it is desirable to have the green and yellow light bulbs 13 and 14 respectively, subject to control by operation of the stop or danger signal bulb 15, so that which either of the bulbs 13 or 14 be ignited at the time that it is necessary or desirable to show the red or stop signal 15, that the bulb 13 or 14 which is ignited will be temporarily extinguished, and this operation is provided through the medium of the contacts 33 and 35 and the contact bridging strip 61 which extends across the bottom of the control block 55. As clearly shown in Figure 1 of the drawings, the energizing of either of the bulbs 13 or 14 is controlled by the passing of the current through the contacts 33 and 35, and when the connection between these contacts is broken, the current will fail to flow through either of the bulbs 13 or 14, and as clearly shown in Figure 6 of the drawings, the connection between the contacts 33 and 35 is broken when the control block 55 is in its upward position for holding the contact bridge 51 in contact bridging position. When the control block 55 is forced downwardly to permit movement of the contact bridge 51 out of operative position, under action of the spring 53, the bridging strip 61 will be moved into bridging engagement with the contacts 33 and 35, which will re-establish a circuit which might have been broken through either of the bulbs 13 or 14. It is understood that the circuits through the bulbs 13 and 14 are primarily controlled by the double pole switch 31 so that even though the strip 61 is in engagement with the contacts 33 and 35, that either the lights 13 and 14 will not be ignited unless its corresponding switch 21 or 24 is closed.

The socket 19 which carries the light bulb 14 is connected to the battery 37 through the wire 38, and plug switch 22 and an auxiliary wire 62 which has direct connection with the socket. The wire 63 which has connection with the socket 19 is adapted to have connection with the wire 39 and by means of this wire through the switch structure 41 to the battery 37. The pilot light 25 is in connection with the light 14 through a shunt circuit including the wires 64 and 65, the latter of which is connected through the switch structure 31, while the former is connected to the wire 63.

From the foregoing description taken in connection with the accompanying drawings, it will be apparent that a novel, practical signal or traffic light structure has been provided which will readily lend itself either for use on a vehicle for the purpose of signalling the following or approaching vehicles or for a traffic signal for use at street intersections.

While I have described what I deem to be the most desirable embodiment of my invention, it is obvious that many of the parts may be varied without in any way departing from the spirit of my invention, and I therefore do not limit myself to the exact details of construction herein shown nor to anything less than the whole of my invention limited only by the appended claims.

What I claim is:—

1. A signal comprising a housing having a clear lens at its outlet, a substantially spherical shell segment disposed within said housing intermediate its ends and being provided with a plurality of openings, radiating ribs formed on said shell and extending from the rear portion thereof between the openings in a manner to provide compartments, lenses of different colors positioned one in each of said openings, means positioned for separately illuminating each compartment in a manner whereby the light rays therefrom pass through the colored lenses to the clear lens.

2. A signal comprising a housing having a clear lens at its outlet end, a substantially spherical shell segment disposed within said housing intermediate its ends, said shell being provided with a plurality of openings, ribs extending rearwardly from said shell and separating the openings in a manner to form compartments, with an opening in each compartment, spaced guides for receiving the ribs, lenses of different colors positioned one in each of said openings, lamp bulbs in the rear of said shell and having portions thereof arranged in the compartments for illuminating the openings separately and in a manner whereby the rays of illumination will pass to the clear lens through the colored lenses so as to illuminate the clear lens in its entirety.

3. A signal of the character described comprising a housing including a forward section, a central section and a rear section detachably associated to provide the housing, a clear lens closing the front end of the forward section, spaced guides extending from the wall of the central section, lamp sockets in the rear section, a shell disposed in the central section and being formed substantially in the shape of a segment of a sphere with openings arranged in triangular formation therein, ribs extending from the rear of said shell between the openings and received between the spaced guides for holding said shell in position and also for providing compartments, lenses of different colors one arranged in each opening and a lamp for each compartment and having electrical connection with the sockets, and said lamps having portions in the compartments whereby rays of illumination therefrom are passed through the colored lenses to the clear lens as and for the purpose specified.

In testimony whereof I affix my signature.

ALBERT RODGERS WARNER.